United States Patent [19]
Leisner et al.

[11] Patent Number: 5,884,746
[45] Date of Patent: Mar. 23, 1999

[54] MODULAR ASSEMBLY LINE SYSTEM

[75] Inventors: Ernst Leisner, Ditzingen; Sven Ost, Stuttgart, both of Germany

[73] Assignee: Robert Bosch GmbH, Stuttgart, Germany

[21] Appl. No.: 702,432

[22] PCT Filed: Jan. 17, 1996

[86] PCT No.: PCT/DE96/00049

§ 371 Date: Sep. 24, 1996

§ 102(e) Date: Sep. 24, 1996

[87] PCT Pub. No.: WO96/24545

PCT Pub. Date: Aug. 15, 1996

[30] Foreign Application Priority Data

Feb. 10, 1995 [DE] Germany ............... 195 04 457.6

[51] Int. Cl.⁶ ............... B65G 37/00; B65G 25/00; B65G 21/06; B65G 47/10

[52] U.S. Cl. ............... 198/346.1; 198/465.2; 198/583; 198/370.1

[58] Field of Search ............... 198/346.1, 465.2, 198/346.2, 583, 465.1, 370.1

[56] References Cited

U.S. PATENT DOCUMENTS

| | | | |
|---|---|---|---|
| 3,642,158 | 2/1972 | Koennecke et al. | 198/465.2 |
| 4,014,428 | 3/1977 | Ossbahr | 198/465.3 |
| 4,730,718 | 3/1988 | Fazio et al. | 198/370.1 |
| 4,762,218 | 8/1988 | Sticht | 198/583 |
| 4,787,496 | 11/1988 | Prodel et al. | 198/346.1 |
| 4,934,507 | 6/1990 | Blocker | 198/346.1 |
| 5,205,026 | 4/1993 | Sticht | 198/465.2 |

FOREIGN PATENT DOCUMENTS

| | | |
|---|---|---|
| 0013733 | 8/1980 | European Pat. Off. . |
| 0430739 | 6/1991 | European Pat. Off. . |
| 0623533 | 11/1994 | European Pat. Off. . |

Primary Examiner—William E. Terrell
Assistant Examiner—Joe Dillon, Sr.
Attorney, Agent, or Firm—Venable; George H. Spencer; Norman N. Kunitz

[57] ABSTRACT

A modular assembly line system is proposed having transport means for the transport of workpiece carriers (64) receiving parts or components and having processing stations (61, 62) arranged one behind the other in the direction of conveyance, wherein the transport means have a main circulating path (10) composed of main circulating path segments arranged one behind the other and secondary path segments (31 to 37) which can be branched off from the main circulating path segments, and the secondary path segments (31 to 37) each have a feed-out section (42) and a feed-in section (44) extending transversely to the main circulating path, a secondary transport section (59) being arranged between feed-out section and feed-in section and extending in the direction of conveyance of the main circulating path (10), with the feed-out section (42) and the feed-in section (44) having opposite directions of conveyance and with the main circulating path segments and/or the secondary path segments accommodating at least one processing station (61, 62). The feed-out section (42) is configured as a feed-out module (41) and the feed-in section (44) as a feed-in module (43), which can respectively be coupled in between two main circulating path segments arranged one behind the other. The secondary transport section (59) is configured as at least one station module (51 to 57) that can be inserted between the feed-out module (41) and the feed-in module (43).

13 Claims, 4 Drawing Sheets

MODULAR ASSEMBLY LINE SYSTEM

PRIOR ART

The invention is based on a modular assembly line system of the type having transport means for the transport of workpiece carriers receiving parts or components and having processing stations arranged one behind the other in the direction of conveyance, wherein the transport means have a main circulating path composed of main circulating path segments arranged one behind the other and secondary path segments which can be branched off from the main circulating path segments, and the secondary path segments are each configured with a feed-out section and a feed-in section extending transversely to the main circulating path, with a secondary transport section being arranged between a feed-out section and a feed-in section and extending in the direction of conveyance of the main circulating path, with the feed-out section and the feed-in section having opposite directions of transport, and with the main circulating path segments and/or the secondary path segments being able to accommodate at least one processing station. Such an assembly line system is described in the DE-OS 42 29 067 wherein a majority of modules of identical length, which are arranged one behind the other in the longitudinal direction, form a main circulating path segment, each module having a forward and return transport section. The modules, which are each provided with a forward and return transport section, form a base module to which optionally a secondary path segment can be coupled respectively as a shunting module. The shunting module is provided with two crossover transport paths running parallel to one another and being opposite in their direction of transport and with a secondary transport section extending between the crossover transport paths.

SUMMARY AND ADVANTAGES OF THE INVENTION

The modular assembly line system according to the invention has the advantage that individualized assembly line systems with a free choice in the main dimensions can be realized by means of a manageable number of modules with a clearly defined functionality. A replacement of station modules, for example, in the event of a later higher level of automation by way of replacing manual workstations with automatic stations, does not affect the main circulating path of the assembly line system. It is even possible to maintain the operation with the non-affected stations while a station module is being replaced for the purpose of retrofitting individual workstations. This results in an assembly line production or assembly with many variants and with a considerable gain in productivity.

For the assembly of a new product, the self-sufficient modules can be put together without any specialized knowledge to form a fundamentally new assembly line system within a short time and the system can be supplemented by further modules or processing stations. Once selected, the system operator is merely bound by his modular dimension of the depth of the station module, which dimension is determined by the uniform length of his feed-out and feed-in modules. The station width can be selected entirely freely. The high degree of reutilization and the simplicity of combining the modules result in greatly reduced investment costs for the retrofitting of the assembly line system to fit new products.

By means of the measures listed in the dependent claims, advantageous modifications and improvements of the modular assembly line system cited in the main claim are possible. The retrofitting capability of the assembly line system can be further increased by configuring the main circulating path segments as replaceable section modules. The passage time of the workpiece carriers can be shortened in that the feed-out and feed-in sections are provided with transfer positions which allow for a direct transfer or forwarding of the workpiece carriers to the next station module. Such a transfer unit is suitably realized by way of two lift/transverse units that are arranged one behind the other in the direction of conveyance.

BRIEF DESCRIPTION OF THE DRAWINGS

An embodiment of the invention is illustrated in the drawings and explained in greater detail in the description below.

DETAILED DESCRIPTION OF THE PREFERRED EMBODIMENTS

Figure 1:
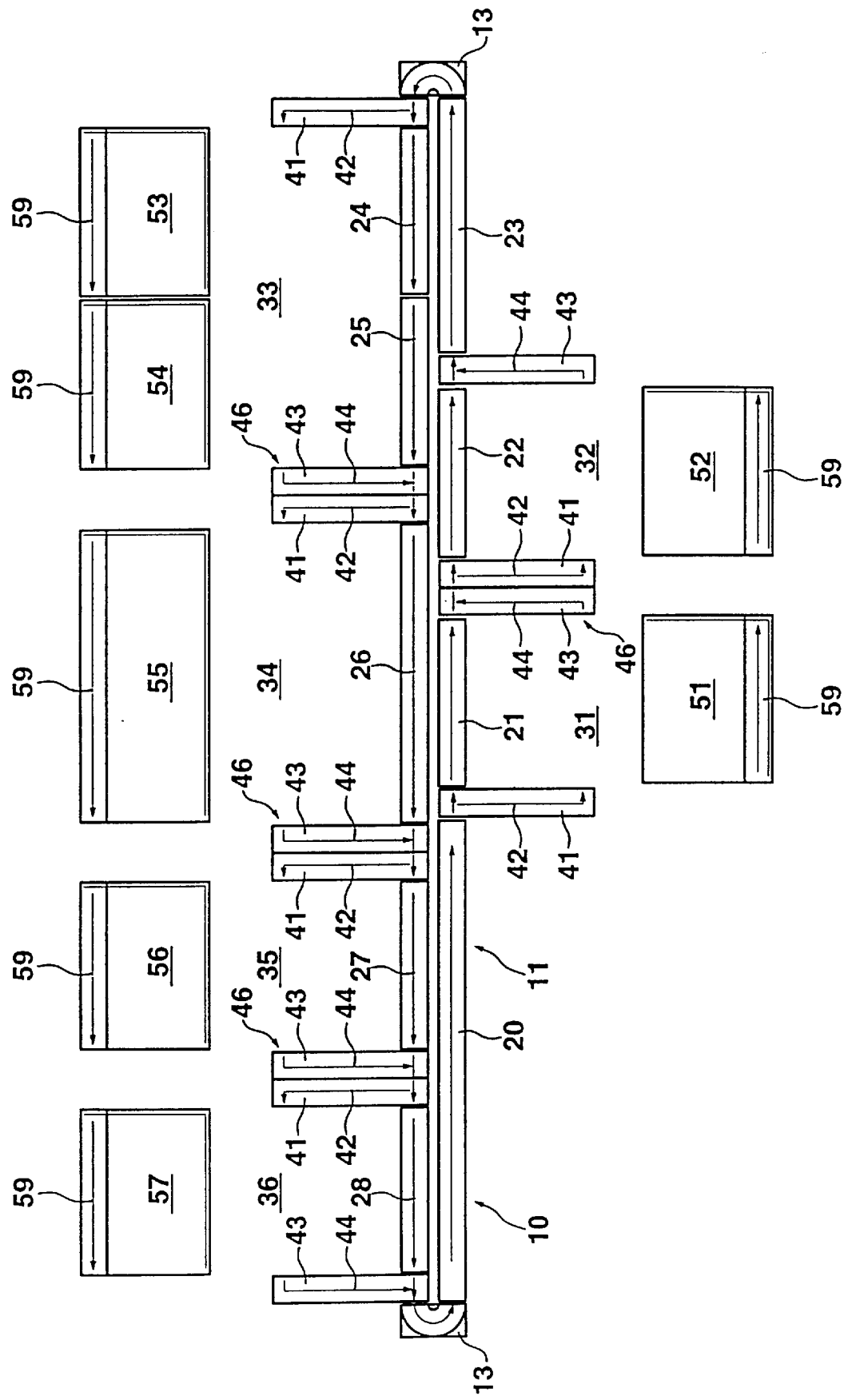
FIG. 1 shows a plan view of modules for an assembly line system, according to the invention

FIG. 1 illustrates a main circulating path 10 having a forward transport section 11 and a return transport section 12 arranged parallel to one another. A respective deflecting module 13 is disposed at the two ends of the forward and return transport section 11, 12. The main circulating path 10 is comprised of a plurality of section modules 20 to 28 arranged one behind the other, with the section modules 20, 21, 22 and 23 forming the forward transport section 11 and the section modules 24, 25, 26, 27 and 28 the return transport section.

In the present embodiment, the transport system of the two transport sections 11, 12 is a twin-belt conveyor, with each section module 20 to 28, for example, having its own drive for the conveying belts of the twin-belt conveyor. But it is equally conceivable to use other transport systems.

Along the forward transport section 11 are disposed a first and a second secondary path segment 31, 32 and along the return transport section 12 are disposed a third, fourth, fifth and sixth secondary path segment 33 to 36. The secondary path segments 31 to 36 are formed respectively by a feed-out module 41 having a feed-out section 42 and a feed-in module 43 having a feed-in section 44 as well as by at least one station module 51 to 57 arranged between the feed-out and feed-in modules 41, 43, with each station module being provided with a secondary path transport section 59. The feed-out modules 41 and the feed-in modules 43 are arranged, for example, at a right angle between two successive section modules 21 to 28.

The feed-in module 43 and the feed-out module 41 of two adjacent secondary path segments are combined to form a feed-in/feed-out module 46. According to FIG. 3, the feed-out sections 42, the feed-in sections 44 and the secondary transport sections 59 are also each provided with a twin-belt conveyor having two conveying belts 15 running parallel to one another.

The illustrated assembly line system uses station modules 51 to 57 of two different dimensions, with the station modules 51, 52, 53, 54, 56 and 57 having the same dimension. In the present embodiment, the station module 55 is configured to be longer in the direction of conveyance. The modular variety is further enhanced in that the secondary path segments 31 to 37 may be embodied with more than one station module 51 to 57. For example, the secondary path segment 33 is equipped with the station modules 53 and 54, each of identical length. But it is also conceivable that more than two station modules are used in a secondary path segment as well as station modules of different length in a secondary path segment.

Figure 2:
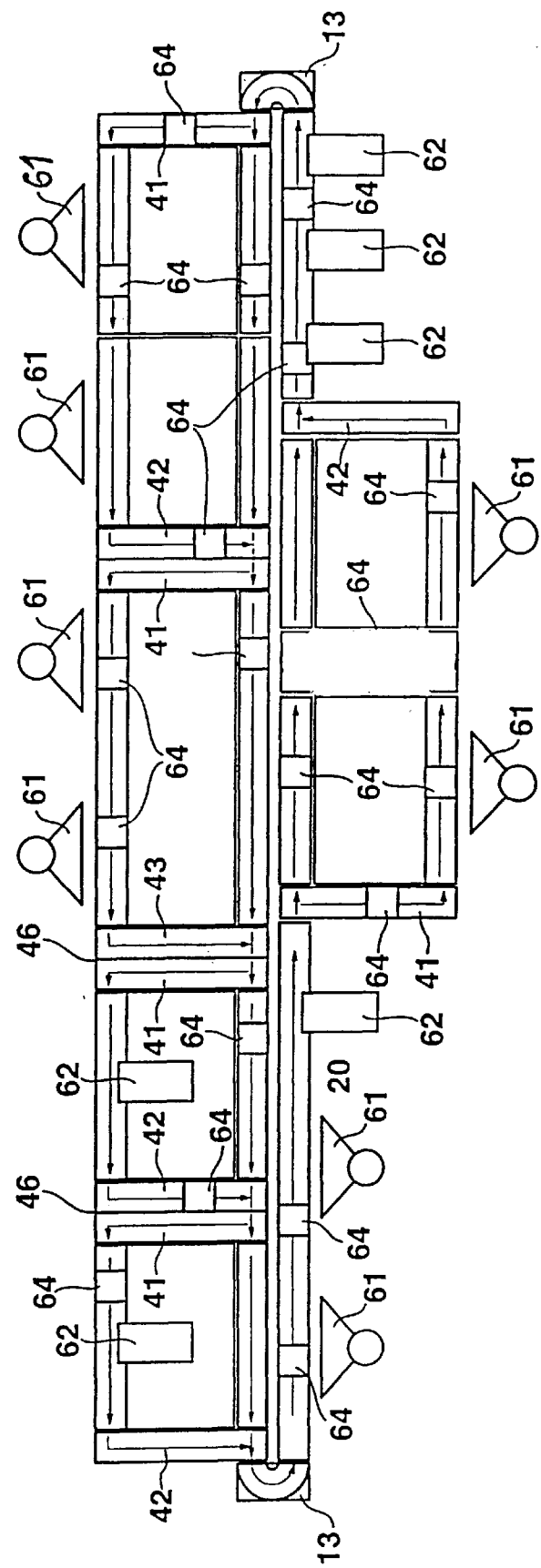
FIG. 2 is a plan view of the assembly line system which is put together from the modules of FIG. 1.

The arrangement of the modules according to FIG. 1 with processing stations 61, 62 is illustrated in FIG. 2, wherein manual workstations are identified by 61 and automatic workstations are identified by 62. The conveying belts 15 of the twin-belt conveyor system, which belts are not shown in detail in FIGS. 1 and 2, transport workpiece carriers 64 loaded with parts or components in the direction indicated by the arrows from processing station to processing station. In the processing stations 61, 62, the workpiece carriers 64 are stopped by stopping devices, not shown, and are positioned.

Figure 3:
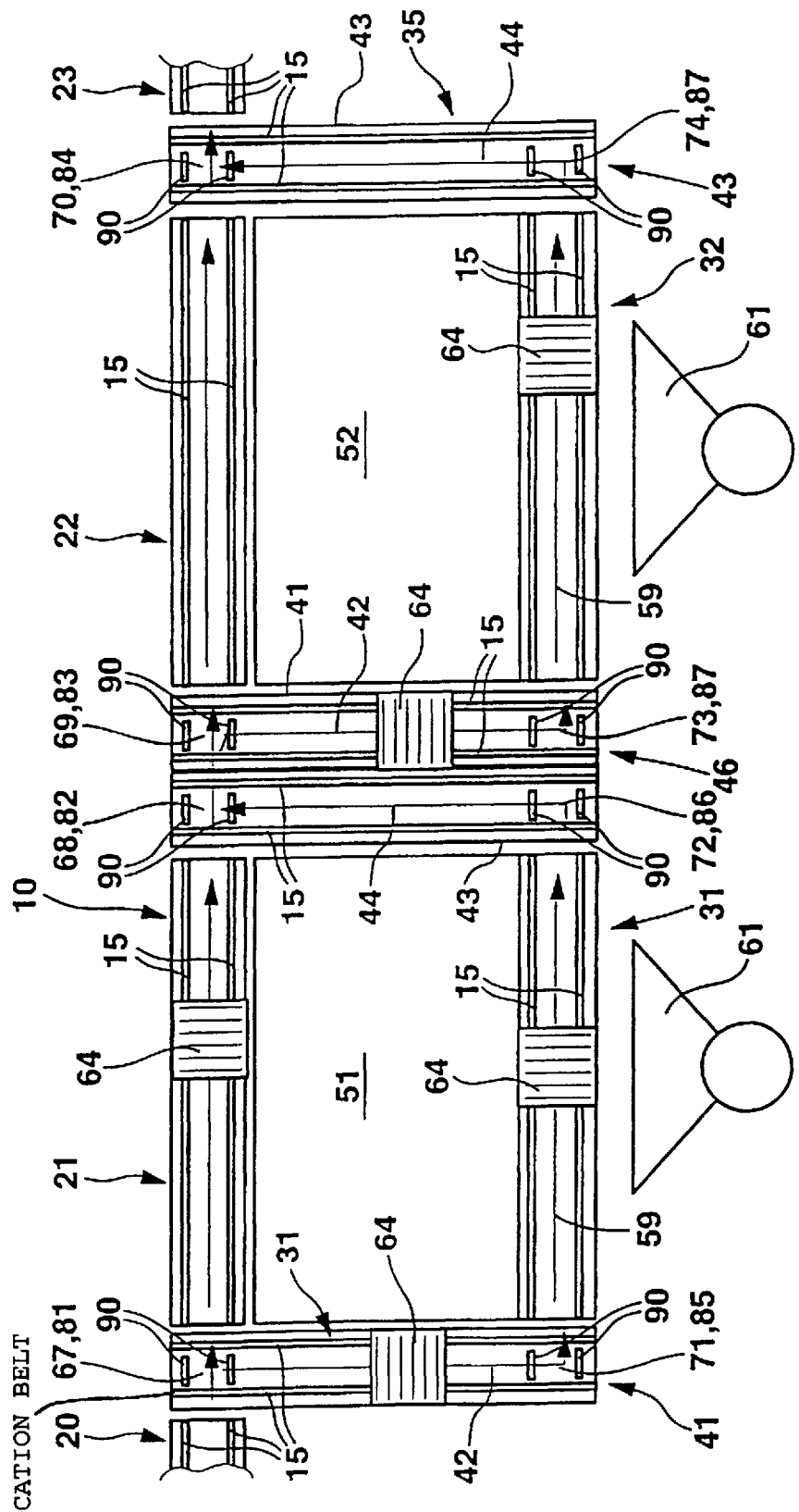
FIG. 3 is an enlarged plan view of two directly adjacent secondary path segments.

The secondary path segments 31 and 32 can be seen in an enlarged plan view in FIG. 3. Along the main circulating path 10 are provided, in the direction of conveyance of the workpiece carriers 64, a first feed-out position 67 with a first transfer unit 81, a first feed-in position 68 with a second transfer unit 82, a second feed-out position 69 with a third transfer unit 83 and a second feed-in position 70 with a fourth transfer unit 84. At the ends opposite of the corresponding transfer unit 81, 82, 83, 84, the feed-out and feed-in sections 42, 44 of the feed-out module 41, of the feed-in/feed-out module 46, and of the feed-in module 43 are provided with transfer positions 71, 72, 73, 74, respectively, each having a further transfer unit 85, 86, 87, and 88.

The transfer units 81 to 88 are, for example, lift/transverse units which are arranged between the conveying belts 15 of the twin-belt conveyors of the feed-out and feed-in sections 42, 44 and which are provided, for example, with two displacement belts 90 each. The direction of conveyance of the displacement belts 90 extends transversely to the direction of conveyance of the conveying belts 15 of the feed-out and feed-in sections 42, 44. The plane of the displacement belts 90 of the transfer units 81 to 88 can be lifted or lowered to above and below the plane of the conveying belts 15 of the feed-out and feed-in sections 42, 44.

The transfer units 81 to 88 are further equipped with stopping devices, not shown, for the selective stoppage of the workpiece carriers 64. Furthermore, upstream of each transfer unit 81 to 88 in the direction of transport, a separator, also not shown, is positioned which only releases the workpiece carriers 64 for forwarding to the feed-out and feed-in positions 67 to 70 as well as into the transfer positions 71 to 74 if the respective transfer unit 81 to 88 is not already occupied by another workpiece carrier 64.

According to FIG. 3, a workpiece carrier 64 supplied by the conveying belt 15 of the section module 20 reaches the first feed-out position 67. If the workpiece carrier 64 is to be fed out to the manual workstation 61 of the first secondary path segment 31, the stopping device of the first transfer unit 81 is activated and the displacement belts 90 of the transfer unit 81 are positioned below the plane of the conveying belts 15 of the feed-out section 42. The workpiece carrier 64 is then lifted by the transfer unit 85 disposed in the first transfer position 71 and guided by the displacement belts 90 of the transfer unit 85 via the feed-out section 42 to the secondary transport section 59 of the station module 51. At the manual workstation 61 of the first station module 51, the workpiece carrier 64 is positioned, for example, also by means of a stopping device, for the implementation of the assembly steps and is released when the steps have been implemented. The workpiece carrier 64 then reaches the second transfer position 72 from where the workpiece carrier 64 is either transported by the feed-in section 44 of the feed-in/feed-out module 46 in the direction of the main circulating path 10 to the feed-in position 68, or is transferred to the third transfer position 73. Forwarding to the transfer position 73 is useful if processing in the station module 52 is required. Therewith, a feeding-in and a subsequent feeding-out of the workpiece carrier 64 is dispensed with, which shortens the circulating time of the workpiece carrier 64. Additionally, the feed-in section 44 and the feed-out section 42 of the feed-in/feed-out module 46 can be utilized as buffer storage for the workpiece carriers 64.

It is equally possible, however, to guide the workpiece carrier 64 in the transfer position 72 via the feed-in section 44 of the feed-in/feed-out module 46 to the feed-in position 68 and to transfer it from the transfer unit 82 arranged there to the second feed-out position 69. There, the workpiece carrier 64 can be forwarded by the transfer unit 83 positioned in the feed-out position 69 either straight ahead to the section module 22 or it can be fed out by the transfer unit 83 of the feed-in/feed-out module 46 into the secondary path segment 32.

If the workpiece carrier 64 is to travel straight ahead in the first feed-out position 67, the displacement belts 90 of the transfer unit 81 are lifted above the plane of the conveying belts of the feed-out section 42, and the workpiece carrier 64 is engaged by the displacement belts 90 of the transfer unit 81 and is forwarded to the conveying belts 15 of the section module 21. The workpiece carrier 64 then reaches the feed-in/feed-out module 46. There, the workpiece carrier 64 is guided by the displacement belts 90 of the transfer unit 82 disposed in the feed-in position 68 via the conveying belts 15 of the feed-in section 44 of the feed-in/feed-out module 46 and is transferred to the second feed-out position 69. As in the first feed-out position 67, the workpiece carrier 64 is again forwarded in the second feed-out position 69 either straight ahead to the section module 22 or it is fed out into the second secondary path segment 32 by the feed-out section 42 of the feed-in/feed-put module 46. After traversing the section module 22 or the secondary path segment 32, the workpiece carrier 64 is transported further to the section module 23 by the transfer unit 84 of the second feed-in position 70.

The decision whether a workpiece carrier 64 in the feed-out position travels on a straight-ahead course to the next section module or is fed out into the secondary path segment is made by a programmable control of the assembly line system which is known per se. The described procedure for the feeding out and feeding in as well as for the transfer or forwarding of the workpiece carrier 64 takes place in the manner described for each secondary path segment.

Figure 4:
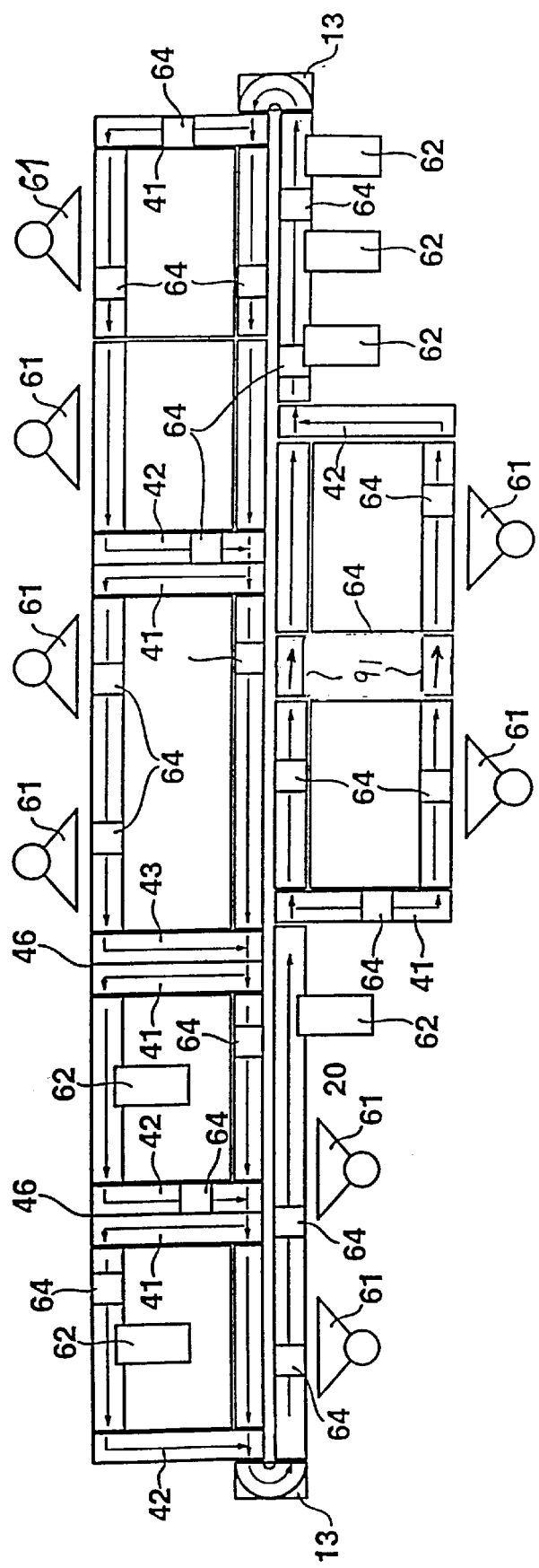
FIG. 4 is a plan view showing a modification of the system of FIG. 2.

Because of the modular configuration, the assembly line according to the invention can be changed at any time with respect to the required processing stations and their sequence. For the retrofitting of the assembly line system, the station modules 51 to 57 are replaceable. But for specific tasks, station modules can also be prepared which are taken from a storage when needed and are coupled into the corresponding secondary path segment. It is also possible to remove one or several secondary path segments from the assembly line system. For this purpose, the feed-out module 41 and the feed-in module 43 or the feed-in/feed-out module 46 are taken out. The gap created between the adjacent section modules can be bridged with, for example, one or two lift/transverse units. But it is equally conceivable to keep further modules, so called bridging modules, as a reserve which merely have a straight-ahead transport section e.g., see modules 91 in FIG. 4, and which can be inserted in place of the feed-out/feed-in modules or the feed-in/feed-out modules. By exchanging section modules, gaps can be created between successive section modules into which gaps the feed-out modules 41, feed-in modules 43 and/or feed-in/feed-out modules 46 can be coupled.

We claim:

1. A modular assembly line system having transport means for the transport of workpiece carriers receiving parts or components and having processing stations arranged one behind the other in the direction of conveyance, wherein the transport means have a main circulating path composed of main circulating path segments arranged one behind the other and secondary path segments which are branched off from the main circulating path segments, and the secondary path segments are each configured with a feed-out section and a feed-in section extending transversely to the main circulating path, and a secondary transport section arranged between a feed-out section and a feed-in section and extending in the direction of conveyance of the main circulating path, with the feed-out section and the feed-in section having opposite directions of transport and with at least one of the main circulating path segments and the secondary path segments accommodating at least one processing station; and wherein: the feed-out section (42) is a single removable feed-out module (41) and the feed-in section (44) is a single removable feed-in module (43), which each have a respective end disposed in the main circulating path in between two main circulating path segments arranged one behind the other, the secondary transport section (59) is formed by at least one separate removable station module (51 to 57) that is inserted between respective other ends of the feed-out module (41) and the feed-in module (43), and the feed-in module (43) and the feed-out module (41) of two secondary path segments (31 to 37) directly following one another alone the main circulating path are combined to form a single removable feed-in/feed-out module (46).

2. An assembly line system according to claim 1, wherein the main circulating path segments are separate replaceable section modules (20 to 28).

3. An assembly line system according to claim 1, wherein a gap intended for the insertion of a feed-out module and a feed-in module between two successive main circulating path segments is bridged by a bridging module.

4. An assembly line system according to claim 1, wherein twin-belt conveyors are provided as transport means for the main circulating path (10) and the secondary path segments (31 to 37).

5. An assembly line system according to claim 4, wherein each module has its own drive for the respective transport means.

6. An assembly line system according to claim 1, wherein the feed-out module (41) is provided with a feed-out position (67, 69) and the feed-in module (43) is provided with a feed-in position (68, 70); and a respective transfer unit (81, 82, 83, 84) is arranged in each of the feed-out and feed-in positions for, in the feed-out position (67, 69) for selectively forwarding the workpiece carriers (64) either into the feed-out section module (42) or into the adjoining main circulating path section module, and in the feed-in position (68, 70) for transferring the workpiece carriers (64) from the feed-in section module (44) into the main circulating path (10).

7. An assembly line system according to claim 6, wherein the transfer units (81 to 88) are each equipped with lift/transverse units having a dislocation belt (90) arranged so that it can be lifted and lowered.

8. An assembly line system according to claim 1, wherein the feed-out module (41) and the feed-in module (43) each have a respective transfer position (71, 72, 73, 74) adjoining the secondary transport section (59) in which transfer position a respective further respective transfer unit (85, 86, 87, 88) is arranged, with the further transfer unit (85, 87) of the feed-out section (42) forwarding the workpiece carrier (64) to the secondary transport section (59) and the further transfer unit (86, 88) of the feed-in section (44) taking over the workpiece carrier (64) from the secondary transport section (59).

9. An assembly line system according to claim 8, characterized in that the transfer unites (81 to 88) are each equipped with lift/transverse units having a dislocation belt (90) arranged so that it can be lifted and lowered.

10. A modular assembly line system having transport means for the transport of workpiece carriers receiving parts or components and having processing stations arranged one behind the other in the direction of conveyance, wherein the transport means have a main circulating path composed of main circulating path segments arranged one behind the other and secondary path segments which are branched off from the main circulating path segments, and the secondary path segments are each configured with a feed-out section and a feed-in section extending transversely to the main circulating path, a secondary transport section arranged between a feed-out section and a feed-in section and extending in the direction of conveyance of the main circulating path, with the feed-out section and the feed-in section having opposite directions of transport and with at least one of the main circulating path segments and the secondary path segments accommodating at least one processing station; and wherein the feed-in section (44) and the feed-out section (42) of two secondary path segments (31 to 37) directly following one another along the maim circulating path are combined to form a single separate replaceable feed-in/feed-out module (46) which is coupled in-between secondary path segments (31 to 37) arranged one behind the other in the secondary.

11. An assembly line system according to claim 10, wherein the secondary transport section (59) arranged between the feed-out section (42) and the feed-in section (44) of a secondary path segment (31 to 37) is configured as at least one replaceable station module (51 to 57).

12. An assembly line system according to claim 10, wherein the feed-in section (44) has a feed-in position (68) and the feed-out section (42) has a feed-out position (69), and a respective transfer unit (82, 83) is arranged in each of the feed-in and feed-out positions, for selectively transferring; the workpiece carriers (64) from the feed-in section (44) to the feed-out position (69) and in the feed-out position (69) selectively forwarding the workpiece carriers (64) into the feed-out section (42) or into the adjoining section module of the main convey or path (20 to 28).

13. An assembly line system according to claim 10, wherein the feed-in section (44) and the feed-out section (42) each have a respective transfer position (72, 73) adjoining the secondary transport section (59) in which transfer position a further respective transfer unit (86, 87) is arranged, with the transfer unit (86) of the feed-in section (44) taking over the workpiece carrier (64) from the upstream secondary transport section (59) and being able to transfer it to the transfer unit (87) of the feed-out section (42), and the transfer unit (87) of the feed-out section (42) forwarding the workpiece carrier (64) to the secondary transport section (59) adjoining in the direction of conveyance.

* * * * *